(12) United States Patent
Zimmermann et al.

(10) Patent No.: US 9,815,200 B2
(45) Date of Patent: Nov. 14, 2017

(54) SAFE ROBOT WITH TRAJECTORY PROGRESS VARIABLES

(71) Applicant: KUKA Roboter GmbH, Augsburg (DE)

(72) Inventors: Uwe Zimmermann, Augsburg (DE); Gerhard Hietmann, Herbertshofen (DE)

(73) Assignee: KUKA Roboter GmbH, Augsburg (DE)

( * ) Notice: Subject to any disclaimer, the term of this patent is extended or adjusted under 35 U.S.C. 154(b) by 73 days.

(21) Appl. No.: 14/959,456

(22) Filed: Dec. 4, 2015

(65) Prior Publication Data

US 2016/0176048 A1   Jun. 23, 2016

(30) Foreign Application Priority Data

Dec. 22, 2014  (DE) .................... 10 2014 226 787

(51) Int. Cl.
*B25J 9/16* (2006.01)
*B25J 17/00* (2006.01)
*B25J 18/00* (2006.01)
*G05B 19/42* (2006.01)

(52) U.S. Cl.
CPC ........... *B25J 9/1664* (2013.01); *B25J 9/1674* (2013.01); *B25J 17/00* (2013.01); *B25J 18/00* (2013.01); *G05B 19/42* (2013.01); *Y10S 901/02* (2013.01); *Y10S 901/28* (2013.01); *Y10S 901/46* (2013.01)

(58) Field of Classification Search
CPC ... A61B 2034/107; A61B 6/547; A61B 34/70; B25J 13/089; B25J 9/1697; G05B 2219/40517; G05B 2219/45123

USPC ........... 700/258, 245, 175; 901/1, 2, 14, 15; 318/568.12

See application file for complete search history.

(56) References Cited

U.S. PATENT DOCUMENTS

| | | | | |
|---|---|---|---|---|
| 5,006,999 A | * | 4/1991 | Kuno | G05B 19/425 219/124.34 |
| 6,070,109 A | * | 5/2000 | McGee | B25J 9/1692 700/254 |
| 7,130,718 B2 | * | 10/2006 | Gunnarsson | B25J 9/1638 219/124.1 |
| 7,443,124 B2 | * | 10/2008 | Bischoff | B25J 9/1674 318/568.17 |
| 7,664,570 B2 | | 2/2010 | Suita et al. | |
| 8,660,694 B2 | | 2/2014 | Lurz et al. | |

(Continued)

FOREIGN PATENT DOCUMENTS

| | | |
|---|---|---|
| DE | 10161470 | 6/2003 |
| DE | 102007059480 | 6/2009 |

(Continued)

OTHER PUBLICATIONS

The extended European Search Report, dated Aug. 25, 2016, in the related European Patent Appl. No. 15194734.8.

(Continued)

*Primary Examiner* — Dalena Tran

(57) ABSTRACT

A method for controlling a multiaxial jointed-arm robot. A plurality of reference data sets are recorded during a previous monitored reference travel. During an operational travel, a trajectory progress variable is established and is used to monitor the movement of the manipulator on the basis of the reference data sets.

30 Claims, 2 Drawing Sheets

(56) References Cited

U.S. PATENT DOCUMENTS

Figure 1:
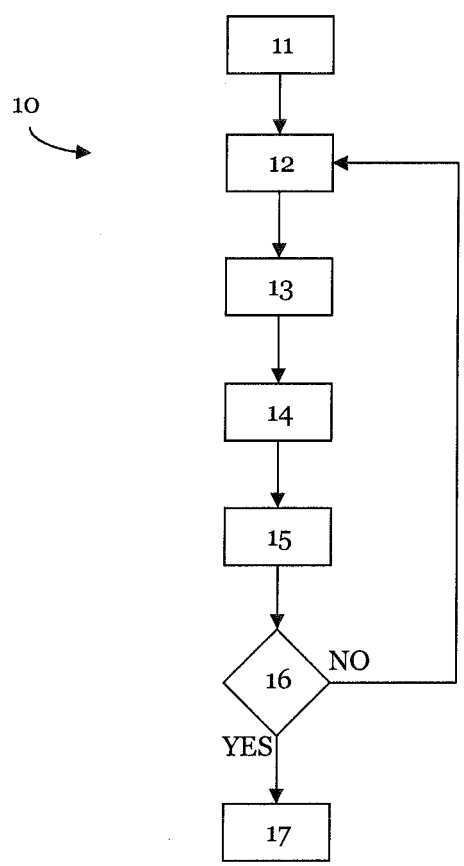

2005/0264251 A1    12/2005  Bischoff et al.
2008/0191654 A1*    8/2008  Blanc ..................... B25J 9/1674
                                                         318/568.24

FOREIGN PATENT DOCUMENTS

DE      102012016206    2/2014
EP           1927440    6/2008

OTHER PUBLICATIONS

Examination Report from GPTO in DE Appl. No. 10 2014 226 787.0, dated Jul. 24, 2015.
The English translation of the Korean Office Action, dated Apr. 12, 2017, in the related Korean Patent Appl. No. 10-2015-0180380.
The English translation of the Chinese Office Action, dated May 27, 2017, in the related Chinese Patent Appl. No. 2015109716702.

* cited by examiner

SAFE ROBOT WITH TRAJECTORY PROGRESS VARIABLES

This application claims the benefit of priority under 35 §119(a) to German Patent Application No. 10 2014 226 787.0, filed on Dec. 22, 2014.

1. TECHNICAL FIELD

The present invention relates to a method for controlling a manipulator, and in particular for controlling a multiaxial jointed-arm robot.

2. TECHNICAL BACKGROUND

Robots, and in particular industrial robots, are used for various work processes, for example, in industrial environments for the production, assembly or processing of various workpieces. Robots can then also share a workspace with a human, for example, if a workpiece is processed by a robot and a human simultaneously. Such an application or such a working environment is also referred to as human-robot collaboration (HRC).

A robot can comprise several axes which are freely programmable. The manipulator constitutes the actual mechanical system of the robot. The manipulator or robot arm can consist of a series of rigid links, which are connected via joints. The placement or position of a robot can be described by the position of the individual joints.

In order to ensure that a robot does not collide with its surrounding environment during operation and thereby cause damage to itself and/or to the surrounding environment, a reliable monitoring of a robot movement has become an important functionality of modern robot systems. In particular in the case of HRC applications, this involves strict safety requirements. For example, in the case of laser applications, it must be ensured that a robot travels along a precisely defined trajectory and does not deviate from this trajectory or leave a defined workspace. Most safety systems rely on a precise recording of position values and/or other dynamic variables, such as speed values.

The object of the present invention is to allow reliable controlling of a manipulator and, in particular, to improve existing safety concepts. In particular, a method is to be provided with which a robot can be controlled in a flexible manner while at the same time ensuring a reliable monitoring of the robot movement.

This and other objectives, which will become apparent on reading the following description of the invention, are achieved by means of the subject matter of the independent claims.

3. CONTENT OF THE INVENTION

The invention involves a method for controlling a manipulator, and in particular for controlling a multiaxial jointed-arm robot. The method according to the invention is preferably suitable for controlling a manipulator during an operational travel, i.e. in normal operation, which is preferably controlled automatically or is program-controlled on the basis of a trajectory plan. The method according to the invention includes a provision of a plurality of reference data sets, with every reference data set describing a reference manipulator position. The provision can preferably also comprise a generation of the plurality of reference data sets. Preferably, the reference data sets differ from one another, so that these describe various reference manipulator positions.

The reference data sets can advantageously describe multiple reference manipulator positions, which the manipulator occupies during a travel according to a trajectory plan during, for example, a reference travel and/or the normal operation. A travel is preferably understood in this context as a movement or displacement of the tool center point of the manipulator along a path or trajectory, thus the travel of the manipulator is preferably understood as meaning a movement of the manipulator.

In addition, the method according to the invention includes a recording of an actual manipulator position. The person skilled in the art will understand that the terms "reference manipulator position" and "actual manipulator position", or the term "manipulator position" generally, describe a configuration of the manipulator, or a position, a placement or a state of the manipulator. Thus a manipulator position can be, for example, representative of an orientation or a pose of the manipulator. For example, a manipulator position can comprise axis variables or axis angles, which describe a certain axis position of the manipulator. The recording of a manipulator position, or of an actual manipulator position, can thus take place by means of a suitable sensor system, for example by means of incremental encoders. The person skilled in the art will however understand that a manipulator position can additionally take into account the state of other additional axes, asynchronous axes, axes of tongs and grippers as well as more complex kinematics such as cooperating robots, for example.

In accordance with the method according to the invention, an actual trajectory progress variable (actual TPV) is additionally determined, based on the recorded actual manipulator position and a previously recorded actual manipulator position. The determined actual TPV is thus based on the currently recorded actual manipulator position and also on a history, which can comprise at least one previously recorded actual manipulator position. They are thus, amongst other things, representative of the progress of the robot movement with regard to the trajectory plan.

Furthermore, the method according to the invention includes an identification of a reference manipulator position from at least one of the provided reference data sets, with the identification being based on the determined actual TPV. Based on the determined actual TPV, at least one of the provided reference data sets is consulted, and a reference manipulator position is identified.

In accordance with the method according to the invention, there is also a determination of whether a difference between the identified reference manipulator position and the recorded actual manipulator position is greater than a pre-defined limit value. In other words, there is a checking of the correspondence between the identified reference manipulator position and the recorded actual manipulator position. The person skilled in the art will understand that the correspondence between the identified reference manipulator position and the recorded actual manipulator position is 100 percent in the best case scenario, i.e. if, for example, there are no interruptions in the operating procedure. Because, in reality, a certain level of inaccuracy must always be expected, however, the person skilled in the art knows to set a corresponding tolerance or fault tolerance and to specify the pre-defined limit value accordingly. Such tolerance limits for the comparison of the identified reference manipulator position and the recorded actual manipulator position can preferably be specified in a corresponding configuration step.

In accordance with the method according to the invention, the manipulator is controlled in response to the determination. Thus, if it is determined that the difference between the identified reference manipulator position and the recorded actual manipulator position is greater than the pre-defined limit value, the manipulator can be controlled accordingly so as to advantageously respond to the determined deviation.

The controlling preferably comprises a stopping of the manipulator and/or introduction of a response strategy. The person skilled in the art knows that, if the difference between the identified reference manipulator position and the recorded actual manipulator position is greater than the pre-defined limit value, generally to respond to this, and moreover, how this is to be responded to. The choice of the appropriate response can be made dependent on the application of the manipulator or the current application. Thus an emergency stop of the manipulator can be executed, for example, or the manipulator can also be reoriented or repositioned according to a pre-defined trajectory. Alternatively or additionally, an end effector can also be controlled in response to the determination. Thus, for example, if the end effector comprises a laser, said laser can be deactivated if it is determined that the difference between the identified reference manipulator position and the recorded actual manipulator position is greater than the pre-defined limit value.

The method according to the invention thus makes it possible to select a suitable reference manipulator position and to check the current movement or position of the manipulator based on same. The use of trajectory progress variables allows an efficient and rapid identification of the suitable reference manipulator position. Because the trajectory progress variables are determined based on a current, and at least one previous, actual manipulator position, the robot can also be moved at a speed which differs from a speed at which a reference travel was undertaken in order to record the reference manipulator positions. With the method according to the invention, a precise checking of the movements can thus be guaranteed even at various manipulator speeds.

A reference trajectory progress variable (reference TPV) is preferably assigned to every reference data set. Particularly preferably, a unique reference TPV is assigned to every reference set. The reference TPV of one reference set is thus different to those of the other reference sets. Thus a unique assignment can be realized between actual manipulator positions and reference manipulator positions using the trajectory progress variables.

It is also preferable that the identification of the reference manipulator position comprises a selection of a reference data set based on the determined actual TPV. This selection takes place in such a way that the reference TPV of the selected reference data set is closest to the determined actual TPV. Thus a most suitable reference data set is chosen, so that the difference between the reference TPV of the selected reference data set and the determined actual TPV is minimal. The corresponding reference manipulator position identified in this way should correspond in the optimal (uninterrupted) case to the recorded actual manipulator position. Because only the actual TPV and the individual reference TPVs are required in order to find a suitable reference data set, the method according to the invention allows very efficient identification of the required reference manipulator position for the purpose of monitoring the movement of the manipulator. Advantageously, it is not necessary to conduct a laborious search in a multi-dimensional field or a multi-dimensional matrix, as would be required, for example, in the event of searching for directly suited reference axis values based on actual axis values.

The identification of the reference manipulator position preferably comprises a selection of at least two different reference data sets based on the actual TPV, so that both of the reference TPVs of the selected reference data sets are closest to the determined actual TPV, and calculation, based on an interpolation of the selected reference data sets, of a reference manipulator position. Two reference data sets are thus consulted which best reflect the current state of the manipulator. The reference manipulator position, which is consulted for the following comparison with the recorded actual manipulator position, is then calculated based on an interpolation of the two selected reference data sets or the corresponding reference manipulator positions according to the selected reference data sets. It is thus possible to obtain a reference manipulator position from the reference data sets, which best suits the current state of the manipulator, and thus allows a precise comparison or a precise monitoring.

The person skilled in the art will understand that more than two reference data sets can be selected based on the actual TPV (and the respective reference TPVs) and consulted for the calculation of the reference manipulator position. Thus, for example, if three different reference data sets were to be selected, a reference manipulator position can be calculated based on a spline interpolation of the corresponding reference manipulator positions of the selected reference data sets. Depending on the use or application, the precision of the monitoring of the manipulator movement can thus be further improved.

Every actual TPV and every reference TPV is preferably calculated with the same algorithm. The reference TPV and the actual TPV can thus be easily compared with one another, so as to quickly and with a minimum of computing time find a corresponding reference manipulator position for an actual manipulator position. It is also preferable that every actual TPV and every reference TPV is a scalar. This means that less computing time is required to identify a suitable reference manipulator position using the method according to the invention.

The determinant actual TPV is preferably also based on a previously recorded actual TPV. The person skilled in the art will understand that the method according to the invention is, if possible, executed many times during the operation of the manipulator and, advantageously, as many times as possible. The previously recorded actual manipulator position or the previously recorded actual TPV was thus identified during the operation of the manipulator at a prior time. The person skilled in the art will also understand that, at the start of the travel, i.e., before the first step of a trajectory plan is executed, the corresponding TPV can be reset to zero.

It is also preferable that the determinant actual TPV is also based on an actual TPV recorded in a prior cycle and, more preferably, on an actual TPV recorded in an immediately prior cycle. An existing actual TPV is thus regularly updated, so that it consistently uniquely describes the actual manipulator position and can be used to identify a suitable reference manipulator position. The checking in cycles allows a very safe employment of the manipulator. The method according to the invention is preferably carried out at every interpolation cycle (IPO cycle), which, depending on the components used in a control unit of the robot system, can be freely selected within a broad range, and can, for example, be between 100 μs and 12 ms.

Every reference manipulator position preferably comprises reference axis values and every actual manipulator position, actual axis values. It is also preferable that the determination of the actual TPV comprises an adding up of the changes of the actual axis values and, more preferably, an adding up of the amounts of the changes of the actual axis values. As a result, the trajectory progress variable is unique in every case, as it can only increase. It is also preferable that the change in the actual axis values refers to the change in the actual axis values since the immediately prior cycle.

It is also preferable that the determination of the actual TPV also comprises adding of the added up changes in the actual axis values to the previously recorded actual TPV. In order to determine the actual TPV, a previously determined actual TPV is thus increased by the sum of the axis changes, with the sum of the axis changes preferably comprising the sum of the amounts of the axis changes. Every movement of the manipulator then leads to a larger actual TPV, so that a unique actual TPV is assigned to every actual manipulator position resulting from the movement.

The manipulator preferably has internal sensors, or is connected to external sensors. Particularly preferably, torque sensors can be integrated into the manipulator. Furthermore, every reference manipulator position and the recorded actual manipulator position comprise sensor data. Thus the determination of whether a difference between the identified reference manipulator position and the recorded actual manipulator position is greater than a pre-defined limit value is also based on a comparison of the sensor data. It is thus possible to check, for example, whether actual torques correspond to respective reference torques. If this is not the case, the movement of the manipulator can advantageously be interrupted. Such a comparison is particularly suited for use in HRC, so that personal injury can be prevented. Every reference manipulator position and the recorded actual manipulator position can preferably also comprise additional data such as switching actions, for example, which are then also monitored by means of the present invention. Which data is to be recorded and monitored can be specified in a corresponding configuration step.

A trajectory plan of the manipulator is preferably divided into several movement sets, and a reference movement set number is also assigned to every reference data set. The movement set numbers identify a corresponding movement set. At least two reference data sets have the same reference movement set number. Every reference data set with the same reference movement set number is preferably assigned a different reference TPV. The use of movement set numbers means that the TPV does not have to be globally determined for the entire robot program, since this could lead to very high variables. Using the movement set numbers, the TPVs are identified locally for each movement set. Thus computing resources can be employed more efficiently.

It is also preferable that the method according to the invention involves a recording of an actual movement set number, and the identification of the reference manipulator position is additionally based on the recorded actual movement set number. This has the advantage that the trajectory program does not have to be started from the beginning, but can instead occur flexibly by set selection. The movement of the manipulator can thus be started at any of several points, for example, of a trajectory program.

The provision of the plurality of reference data sets preferably includes the following steps: travel of the manipulator; recording a plurality of reference manipulator positions; determination, for every reference manipulator position, of a reference TPV, and generation of a plurality of reference data sets, with every reference data set describing one of the recorded reference manipulator positions and every reference data set being assigned one of the determined reference TPVs. In such a reference travel, that trajectory is preferably traveled which is also traveled by the manipulator during operation. It is also preferable that the reference TPV is exactly the same as the actual TPV. It is also preferable that the parameters which describe the manipulator position correspond to the parameters which describe the actual manipulator positions during normal operation of the robot.

According to the invention, current measured actual values, which describe an actual manipulator position, are thus compared with saved or provided reference values. Advantageously, the values are compared not in terms of time, but rather in terms of the point in space. During operation and during a monitored reference travel the trajectory progress variables are established in every interpolation cycle, for example, and are used for the comparison between reference values and actual values.

In principle, the trajectory progress variables can be established in different ways, however the trajectory progress variables should preferably and advantageously be at least unique, speed-independent and independent of the movement type. It is thus advantageously possible to guarantee the movement behavior of the manipulator relative to a reference travel even at different speeds. Furthermore, the person skilled in the art will understand that, in order to establish the trajectory progress variables, no specific trajectory plan knowledge is required. Consequently, the method according to the invention can, for example, also be easily incorporated into a safety control means. For example, a spline trajectory parameter can be used as TPV. The cyclical updating of the TPV according to the invention, preferably based on changes of axis angles, is particularly advantageous, since this method is independent of the movement type of the manipulator.

Furthermore, the present invention comprises a robot system, which comprises a manipulator and a control means. The control means is configured to control a manipulator in accordance with the method according to the invention. In order to do this, the control means can, in particular, provide corresponding modules, which can execute one or more steps of the method according to the invention. In addition, the present invention comprises a computer-readable medium, which contains instructions which, when executed on a computer, implement steps for controlling a manipulator in accordance with the method according to the invention.

4. EXEMPLARY EMBODIMENTS

Figure 2:
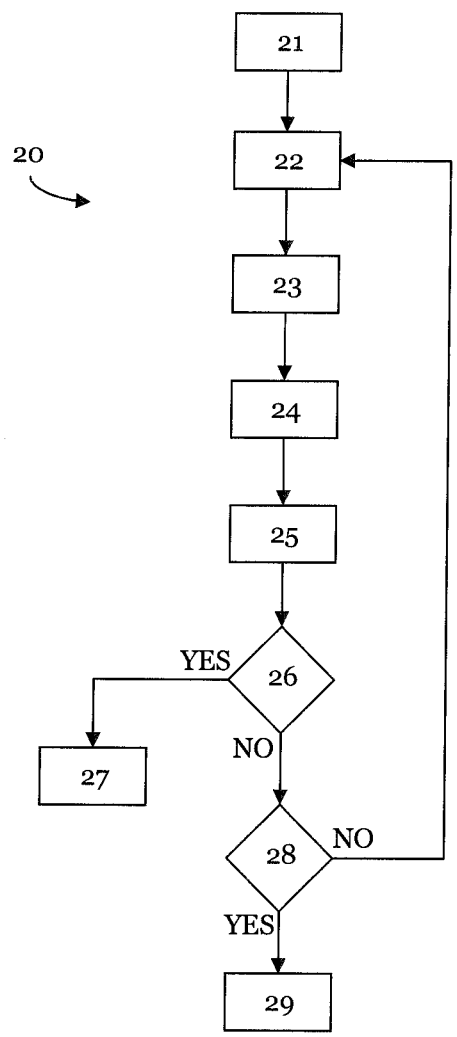

The invention is described in greater detail below with reference to the accompanying figures, in which:

FIG. 1 shows the schematic sequence of a reference travel according to the invention, and FIG. 2 shows the schematic sequence of an operational travel according to the invention.

FIG. 1 is a schematic representation of the sequence 10 of a reference travel in accordance with the method according to the invention. The person skilled in the art will understand that a reference travel is usually carried out before an operational travel, in order to record reference values for the subsequent monitoring during the operational travel. The depicted method 10 begins at step 11. In step 12, a current set number and the current reference axis angle are recorded during an interpolation cycle (here cycle $t_5$, for example).

In the (immediately) following step 13, a reference line progress variable for the current cycle is established. To do this, the sum of the axis changes is established as follows:

$$a_{t5} = |(A_1)_{t5} - (A_1)_{t4}| + \ldots + |(A_m)_{t5} - (A_m)_{t4}|,$$

wherein $a_{t5}$ describes the sum of the change of the axis angle relative to the previous position of the axes in the previous cycle $t_4$, and $A_m$ is the absolute axis angle of the corresponding axis m. The person skilled in the art will understand that, by way of example, for a 6-axis robot, therefore, m=6. Subsequently, a previously determined TPV is increased by the calculated sum of the axis changes as follows:

$$TPV_{t5} = TPV_{t4} + a_{t5}$$

For the first cycle of a robot program or of a movement set the initial $TPV_{t0}$ is reset to zero. The set number recorded in step twelve is not used for the calculation of the TPV.

In step 14, additional reference data is recorded, such as reference torques, for example. In addition, reference switching actions can also be recorded. Which additional reference data is to be recorded was preferably specified in a previous configuration step. In the following step 15, the reference axis angle and set number recorded in step 12, the other reference data recorded in step 14, together with the trajectory progress variables (as reference TPVs) determined in step 13 are saved in a reference value memory.

In the decision 16 it is checked whether the program ends with the current cycle $t_5$. If this is the case, the method m ends in step 17. Otherwise, the number of cycles is increased by 1 and the method is continued at step 12 for the new cycle $t_6$.

The reference database thus recorded during the reference travel comprises a reference data set for every cycle. The following table presents the structure of such a reference database by way of an example.

| Reading cycle | Movement set number | Reference TPV | Other reference data (here: axis values) |
|---|---|---|---|
| 1 | 1 | 12 | $A_1 = 2, A_2 = 8, A_3 = 5, A_4 = 3$ |
| 2 | 1 | 50 | $A_1 = 10, A_2 = 2, A_3 = 9, A_4 = 23$ |
| 3 | 1 | 123 | $A_1 = 22, A_2 = 31, A_3 = 15, A_4 = 49$ |
| ... | ... | ... | |
| 121 | 1 | 124754 | $A_1 = 57, A_2 = 71, A_3 = 25, A_4 = 13$ |
| 122 | 2 | 15 | $A_1 = 61, A_2 = 68, A_3 = 19, A_4 = 11$ |
| 123 | 2 | 50 | $A_1 = 51, A_2 = 75, A_3 = 8, A_4 = 18$ |
| ... | ... | ... | |
| 1032 | 17 | 46897 | $A_1 = 175, A_2 = 4, A_3 = 95, A_4 = 29$ |

FIG. 2 depicts an exemplary sequence 20 of an operational travel. The person skilled in the art will understand that an operational travel is carried out in normal operation of the manipulator and, for this purpose, the reference data base recorded, for example, with reference travel 10 is advantageously available. The method 20 begins in step 21. In step 22, a current set number and the current actual axis angle are recorded during an interpolation cycle (here cycle $t_{121}$, for example).

In the following step 23 an actual TPV is established for the current cycle. For this purpose, the same method or the same algorithm is advantageously used as was used during the reference travel 10 to establish the reference TPVs. In the next step 24, additional actual data is recorded such as actual torques, for example. Additionally, actual switching actions can also be recorded. Which additional actual data is to be recorded (and then also monitored), was preferably specified in a previous configuration step.

In the following step 26, reference data are identified from the reference to value memory according to the set number recorded in step 22 and the actual TPV established in step 23. To do this, a query comprising the set number and the actual TPV is advantageously sent to the reference value memory, and a most suitable reference data set is provided by this reference value memory in response to the query. For example, with reference to the table presented above, during the operating mode in cycle $t_{121}$ a TPV of 48 was identified for a current movement set 2. Using these two values, the corresponding (i.e. closest) reference data set can be quickly found from the reference data. In the example presented in the above table, that would be the data set saved in reading cycle 123 during the reference travel having the reference TPV 50, as this is closest to the actual TPV of 48. The associated reference data (in the example axis values $A_1$-$A_4$) are subsequently used for the checking.

In the decision 26 the actual axis values are compared with the reference axis values. Advantageously, the additional data such as torques and/or switching actions, for example, are also compared. For this purpose it is checked whether a difference between these values is greater than a pre-defined limit value, with the limit value corresponding to a set tolerance. The tolerance can also be specified in a previous configuration step. If it is determined that the difference is too great, i.e. there is no correspondence, the robot is stopped in step 27. Otherwise, i.e., in the case of correspondence, it is ensured that the manipulator is located at the same point in space as in the reference travel. In this case, the method is continued in step 28.

In the decision 28, it is checked whether the program ends with the current cycle $t_{121}$. If this is the case, the method ends in step 29. Otherwise, the number of cycles is increased by 1 and the method is then continued in step 22 for this next cycle $t_{122}$.

It should be noted that the invention claimed herein is not limited to the described embodiments, but may be otherwise variously embodied within the scope of the claims listed infra.

The invention claimed is:

1. A method for controlling a manipulator by a programmable controller having access to a plurality of reference data sets, with every reference data set describing a reference manipulator position along a predetermined path defined by a trajectory plan, each reference manipulator position describing the position of individual joints of the manipulator in the reference manipulator position, the programmable controller performing the steps of:
    recording an actual manipulator position during an operation of the manipulator, the actual manipulator position describing the position of individual joints of the manipulator in the manipulator in the actual manipulator positions;
    determining a value for an actual trajectory progress variable (actual TPV), wherein the value is determined as a function of the recorded actual manipulator position and a previously recorded actual manipulator position and is independent of any speed characteristic of the manipulator;
    selecting a reference manipulator position from at least one of the plurality of reference data sets, the reference manipulator position selected by comparing a value of a TPV for the selected reference manipulator position with the value of the determined actual TPV;
    determining whether a difference between the selected reference manipulator position and the recorded actual manipulator position is greater than a pre-defined limit value, and
    stopping movement of the actual manipulator position when the difference is greater than the pre-defined limit value.

2. The method according to claim 1, wherein the method comprises introducing a response strategy when the difference is less than or equal to the pre-defined limit value.

3. The method according to claim 1, wherein a reference trajectory progress variable (reference TPV) is assigned to every reference data set, and further wherein the reference TPV assigned to each reference data set has a unique value.

4. The method according to claim 3, wherein the selection of the reference manipulator position comprises selecting the reference manipulator position such that the value of the reference TPV of the reference data set for the selected reference manipulator position is closest among the reference TPV values of the plurality of reference data sets to the determined value for the actual TPV.

5. The method according to claim 3, wherein the selection of the reference manipulator position comprises:
  selecting at least two different reference data sets such that the values of the reference TPVs for each of the selected reference data sets are closest among the reference TPV values of the plurality of reference data sets to the determined actual TPV, and
  calculating a reference manipulator position based on an interpolation between the reference manipulator positions of the selected reference data sets.

6. The method according to claim 3, the value of the actual TPV and values for each reference TPV are scalar values.

7. The method according to claim 1, wherein the determination of the value of the actual TPV is additionally based on the value of a previously recorded actual TPV.

8. The method according to claim 1, wherein every reference manipulator position comprises reference axis values describing the positions of the individual joints of the manipulator and wherein every actual manipulator position comprises actual axis values describing the positions of the individual joints.

9. The method according to claim 8, wherein the determination of the value of the actual TPV comprises:
  determining differences between each of the axis values for the recorded actual manipulator position and corresponding axis values for the previously recorded actual manipulator position; and
  summing the absolute values of the differences between the axis values.

10. The method according to claim 9, wherein the determination of the actual TPV additionally comprises adding the absolute values of the differences between the axis values to a previously recorded actual TPV.

11. The method according to claim 1, wherein the manipulator includes sensors and every reference manipulator position and the recorded actual manipulator position additionally comprise sensor data, wherein the sensors preferably comprise torque sensors and the sensor data comprises torques.

12. The method according to claim 1, wherein the trajectory plan of the manipulator is divided into several movement sets each having a reference set number, and wherein a corresponding one of the movement set numbers is assigned as a reference movement set number to each reference data set, wherein at least two reference data sets have the same reference movement set number, and wherein each reference data set with the same reference movement set number is assigned a different reference TPV.

13. The method according to claim 12, additionally including assigning a corresponding one of the movement set numbers as an actual movement set number and recording the actual movement set number, wherein the identification of the reference manipulator position is additionally based on matching the reference set number of the reference manipulator position to the recorded actual movement set number.

14. The method according to claim 1, wherein the provision of the plurality of reference data sets includes:
  travelling of the manipulator;
  recording of a plurality of reference manipulator positions;
  determining, for every reference manipulator position, of a reference TPV, and
  generating a plurality of reference data sets, with every reference data set describing one of the recorded reference manipulator positions and every reference data set is assigned one of the determined reference TPVs.

15. The method according to claim 1, wherein the steps of recording, determining, selecting and determining are repeatedly performed during each of a plurality of interpolation cycles, and the determination of the value of the actual TPV in a current one of the plurality of interpolation cycles is additionally based on of the value of an actual TPV recorded in a prior cycle to the current interpolation cycle.

16. The method according to claim 1, wherein the steps of recording determining, selecting and determining are repeatedly performed during each of a plurality of interpolation cycles, and the determination of the value of the actual TPV in a current one of the plurality of interpolation cycles is additionally based on the value of an actual TPV recorded in an immediately prior cycle to the current interpolation cycle.

17. A robot system comprising;
  a manipulator; and
  a controller configured to:
    record an actual manipulator position during an operation of the manipulator,
    determine a value for an actual trajectory progress variable (actual TPV), wherein the value is determined as a function of the recorded actual manipulator position and a previously recorded actual manipulator position and is independent of any speed characteristic of the manipulator,
    select a reference manipulator position from at least one of a plurality of reference data sets, wherein each one of the plurality of reference data sets describes a reference manipulator position along a predetermined path defined by a trajectory plan and the selected reference manipulator position is selected by comparing a value of a TPV for the selected reference manipulator position with the value of the determined actual TPV,
    determine whether a difference between the identified reference manipulator position and the recorded actual manipulator position is greater than a pre-defined limit value, and
    stop movement of the actual manipulator position when the difference is greater than the pre-defined limit value.

18. The robot system according to claim 17, wherein the controller is configured to introduce a response strategy when the difference is less than or equal to the pre-defined limit value.

19. The robot system according to claim 17, wherein a reference trajectory progress variable (reference TPV) is assigned to every reference data set, and further wherein the reference TPV assigned to each reference data set has a unique value.

20. The robot system according to claim 19, wherein the controller is configured to select the reference manipulator position such that the value of the reference TPV of the reference data set for the selected reference manipulator position is closest to the determined actual TPV.

21. The robot system according to claim 19, wherein the controller is configured to select the reference manipulator position by:
   selecting at least two different reference data sets such that the values of reference TPVs for each of the selected reference data sets are closest among the reference TPV values of the plurality of reference data sets to the determined actual TPV, and
   calculating a reference manipulator position based on an interpolation between the reference manipulator positions of the selected reference data sets.

22. The robot system according to claim 19, wherein the value of the actual TPV and values for each reference TPV are scalar values.

23. The robot system according to claim 17, wherein the controller is configured to determine the value of the actual TPV based additionally on the value of a previously recorded actual TPV.

24. The robot system according to claim 17, wherein every reference manipulator position comprises reference axis values describing the positions of the individual joints of the manipulator and wherein every actual manipulator position comprises actual axis values describing the positions of the individual joints.

25. The robot system according to claim 24, wherein the controller is configured to determine the actual TPV by:
   determining differences between each of the axis values for the recorded actual manipulator position and corresponding axis values for the previously recorded actual manipulator position; and
   summing the absolute values of the differences between the axis values.

26. The robot system according to claim 25, wherein the controller is configured to determine the actual TPV additionally by adding the absolute values of the differences between the axis values to a previously recorded actual TPV.

27. The robot system according to claim 17, wherein the manipulator includes sensors and every reference manipulator position and the recorded actual manipulator position additionally comprise sensor data, wherein the sensors preferably comprise torque sensors and the sensor data comprises torques.

28. The robot system according to claim 17, wherein the trajectory plan of the manipulator is divided into several movement sets each having a reference set number, and wherein a corresponding one of the movement set numbers is assigned as a reference movement set number to each reference data set, wherein at least two reference data sets have the same reference movement set number, and wherein each reference data set with the same reference movement set number is assigned a different reference TPV.

29. The robot system according to claim 28, wherein the controller is configured in addition for assigning a corresponding one of the movement set numbers as an actual movement set number and recording the actual movement set number, and wherein the identification of the reference manipulator position is additionally based on matching the reference set number of the reference manipulator position to the recorded actual movement set number.

30. The robot system according to claim 17, wherein the controller is configured to provide the plurality of reference data sets by:
   moving the manipulator;
   recording a plurality of reference manipulator positions;
   determining, for every reference manipulator position, a reference TPV, and
   generating a plurality of reference data sets, with every reference data set describing one of the recorded reference manipulator positions and assigning every reference data set to one of the determined reference TPVs.

* * * * *